April 14, 1936.　　F. W. HEUSINKVELD ET AL　　2,037,324
DEVICE FOR WINDING UP ELECTRIC FLEXIBLE CORDS
Filed Oct. 5, 1934
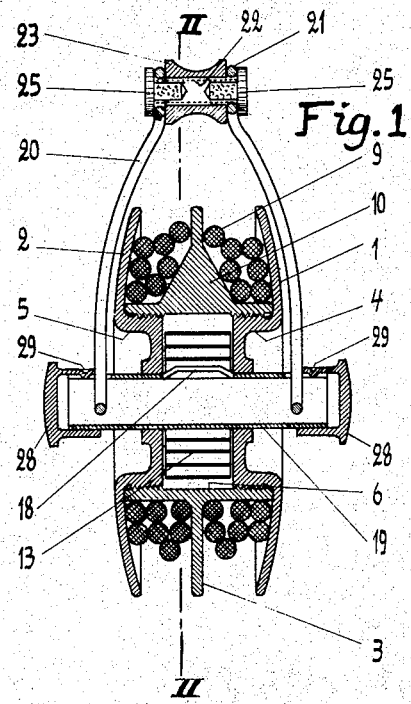
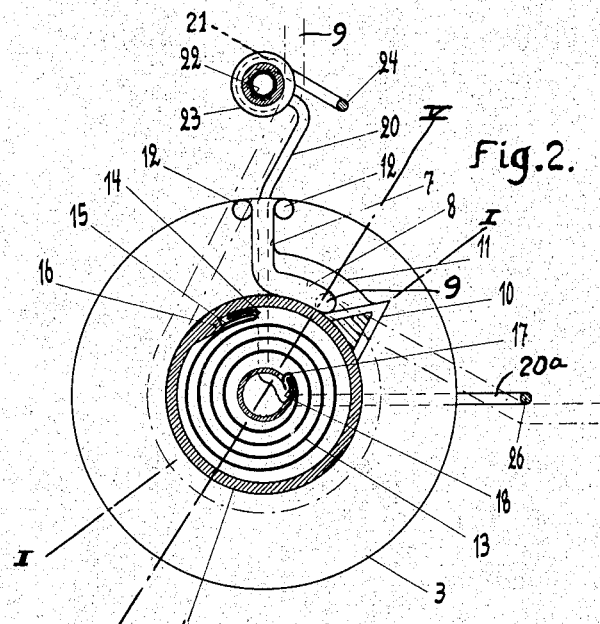
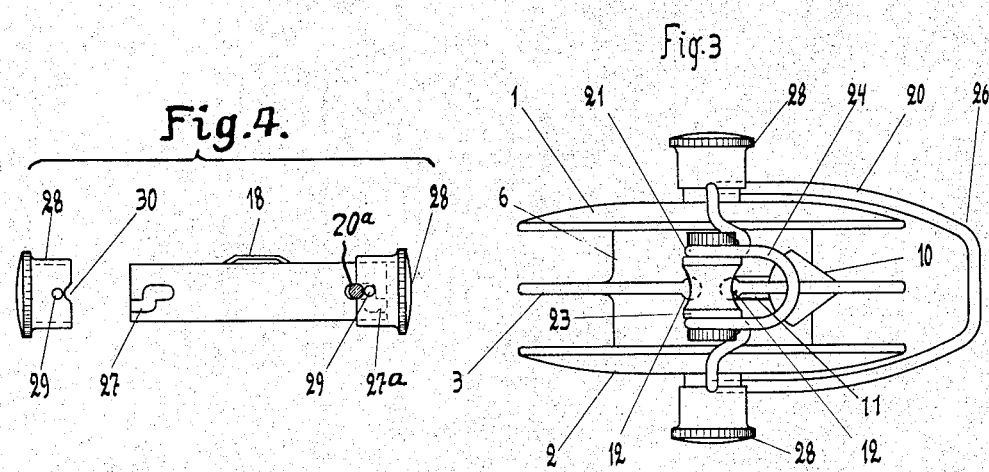
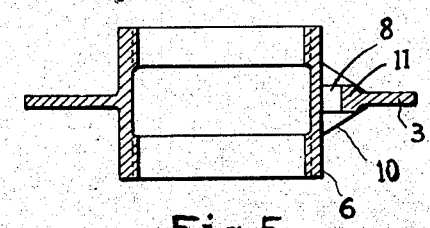

Patented Apr. 14, 1936

2,037,324

UNITED STATES PATENT OFFICE 2,037,324

DEVICE FOR WINDING UP ELECTRIC FLEXIBLE CORDS

Friedrich Wilhelm Heusinkveld, Wuppertal-Elberfeld, and Ernst Grosse Brauckmann, Langschede/Ruhr, Germany Application October 5, 1934, Serial No. 747,111
In Germany October 7, 1933

9 Claims. (Cl. 242—107)

Freely exposed cords of telephones, table lamps, smoothing irons and other electric utensils are usually much longer than is necessary for the normal use of the apparatus, as the apparatus are not stationary but transportable so that they can be put down at any desired place. The freely exposed cords are often a hindrance when the apparatus, for instance an electric smoothing iron, is in use, and they are sometimes a source of danger as in the case of table lamps and table telephones because the cord may throw over articles standing near the apparatus. The freely exposed cords often get entangled, twisted or knotted whereby the easy transporting of the apparatus is impeded. This last mentioned inconvenience especially exists in cords for table telephones as the comparatively long cord connecting the telephone with the earpiece is pulled over the table every time when the telephone is to be used, so that, as the earpiece is used now at the one side and then at the other side of the table, twisting of the flexible cord is unavoidable.

This invention relates to a device designed to avoid this inconvenience. The device consists of a reel, controlled by a spring and on which the cord is automatically wound and off which the cord automatically unwinds as soon as a slight pull is exerted upon it, to wind up again as soon as this pull ceases. The device is so constructed that it can be easily inserted in existing cords, without the necessity of taking to pieces the apparatus or any part of the same, the winding space on the reel being subdivided by a partition into two compartments, one for each end of the cord.

An embodiment of the invention is illustrated by way of example in the accompanying drawing in which:—

Fig. 1 shows the device in section on line I—I of Fig. 2.

Fig. 2 is a section on line II—II of Fig. 1.

Fig. 3 is a top plan of Fig. 2, the cord being omitted.

Fig. 4 shows the axle of the device in elevation with one arm of the suspension strap in cross section.

Fig. 5 is a cross section of the reel alone taken on line V—V of Fig. 2.

The reel for winding up the cord consists of two similar side plates 1, 2 and of a middle disc 3 which serves as a partition which subdivides the winding space into two compartments. Inwardly directed hubs 4, 5 of the side plates 1, 2 engage in the hub 6 of disc 3 and are securely connected therewith in a suitable manner, for instance by screw threads. Owing to the cup-shaped side plates 1, 2 the reel is handy and its winding compartments are very spacious. A radial slot 7 in the middle disc 3 extends to the hub of the reel and merges into a curved slot 8 extending at an angle to slot 7. By the slots 7, 8 a hook is formed in the disc on which the cord 9 can be hooked. At the end of the slot 8 a cone 10 is formed by thickenings on the two sides of the disc 3, which cone has its base on the wall of the hub 6 and its apex near the outer edge of the disc 3. This cone enlarges the base of the hook formed by the slots 7, 8, that is the point on which the cord is hooked, so that the radius of curvature of the cord hooked in the shape of a loop is considerably widened and the cord is saved very much. For further saving of the cord the outer edge of slot 8 may be thickened by a bead 11 and the entrance to the slot 7 may have spherical thickenings 12. The whole edge of the hook-shaped slot 7, 8 and also the rim of disc 3 may have a bead-like reinforcement to make this thin disc 3 stronger.

The conical thickening may extend around the disc 3, being interrupted only by the slots 7, 8. The semi-wedge shaped thickenings forming cone 10 or the circular bead 11 serve further for pushing the cord in the winding compartments towards the outer side in order to better distribute the same.

In the space formed by the hubs 4, 5 of the discs 1, 2 and by the hub 6 of the disc 3 a helically wound spring 13 is accommodated, the hook-shaped end 14 of which, with interposition of steel plate 15, is hooked behind a wedge-shaped projection 16 on the inner side of hub 6. This hook-shaped end 14 of spring 13 may directly act upon the projection 16 without the intermediary of the steel plate 15, although the interpolation of the steel plate is more practical owing to the fact that the end of the spring 13, which has been annealed before it is bent, does not possess sufficient resistance against unbending. The interpolated steel plate 15 transmits the pressure occurring between the reel and the spring upon the base of the hook, whereas if the pressure is directly transmitted the pressure will act upon the hook-shaped end of the spring, whereby the tendency of this end to straighten is lessened. The inner end 17 of spring 13 is hook-shaped and hooked behind a hook-shaped pressed out portion 18 of the tubular axle 19. If the reel is turned in clockwise direction, the axle 19 being securely held, the projection 16 of the reel pulls along the outer end of the spring, whereby the spring is put under tension. If the spring is slack and the reel turned in anti-clockwise direction, the spring is not pulled along and the hook 17 slides without effect over the pressed out portion 18. The novel connection of the spring with the reel prevents the spring from breaking if the reel is intentionally turned in the wrong direction.

The inserting of the spiral spring into the reel casing is very easy, it being merely necessary to push the spring together with the axle into the casing from the side, the connection with the reel casing being then automatically effected if the reel is turned in clockwise direction.

Owing to this manner of connecting the spring with the casing and with the axle, weakening of the spring by rivet holes or the like is avoided, and the connection does not require any auxiliary means, such as rivets or the like.

The reel can turn around the axle 19 in clockwise direction during the unwinding of the cord and in anti-clockwise direction during the winding of the cord. A guide strap 29 for the cord to be wound up is secured in the ends of the tubular axle 14. This guide strap may be of any suitable shape and made in one or several parts. In the form of construction shown it is made of one piece of wire to which by various bends the form shown in Figs. 1 to 3 is given. Lugs 21, designed to receive the bearing bush 22 of a guide pulley 23 and an eye 24 for the passage of the cord are provided in the upwardly directed end of the strap. The bearing bush 22 is formed by a narrowly wound spiral spring around which the pulley 23 can rotate. Head pins 25, the diameter of which approximately corresponds with the inner diameter of the spiral spring, are inserted into the ends of the bearing bush 22, the shank of the pins being roughened. The pins are held in the bush by the roughening but can be removed if a certain force is exerted, this being necessary if the guide pulley 23 has to be removed in order to thread one end of the cord into the eye 24. The easy exchangeability of the pulley 23 makes it possible to insert the winding up device in existing cords without dismounting of the guide strap. With this object in view it is merely necessary to turn in clockwise direction the reel several times around the securely held axle 19, the spring 13 being thereby put under tension, the middle portion of the cord bent in loop shape being then placed into the hook-shaped slot 7, 8, one end of the cord threaded into the eye 24 and the pulley 23 re-inserted again. If the reel is then relieved and the strap 20 securely held, the reel turns under the action of spring 13 in anti-clockwise direction and winds up the cord 9, the two ends separately each in one of the winding compartments formed by the disc 3. By a slight pull exerted upon the cord ends the cord unwinds from the reel which is turned in opposition to the action of the spring 23 and the spring 23 put under tension again. The cord can be stretched for its whole length without being pulled out of the slot 7, 8, owing to the hook-shape of the slot.

The bow 20 is bent approximately at right angles in the axle 19, the outer end forming a loop 26 for holding the cord which is passed through it. The loop 26 may also be fitted with a pulley or roller for guiding the cord. The hollow axle 19 has at its ends axially extending bayonet slots 27, 27a, one for each of the vertically upwardly directed arms 20 and the other for the horizontal arms 20a, so that these slots extend in the form of construction shown by way of example in the circumferential direction of the axle approximately at an angle of 90° apart. The strap 20, resilient in lateral direction, is placed over the ends of the axle so that it slips into the slots and finally drops, after a slight turning, at the bend of slot 27 into the portion of the slot which is farthest directed towards the reel middle. In this position the strap 20 is securely held by means of caps 28 pushed over the ends of the axle. The caps fit tightly over the axle ends and have, near their open ends inwardly projecting nipples 29, which, when the caps are being pushed on, slide along the slots 27 and engage behind the bend in the slot when the cap is turned relative to the axle 19.

To remove the caps they must be turned back against which the caps are, however, ensured to prevent unintentional detaching of the caps. With this object in view the caps have in the open end in front of the nipples 29 a semi-circular incision 30 corresponding to the thickness of the wire of the strap 20, said incision, when the cap is being turned in order to bring its nipple 29 into the bend of slot 27, snaps over the end of the corresponding arm of the bow, which is resilient in outward direction. The cap can then be turned backwards only if at the same time the strap is pressed towards the middle of the reel, so that it comes out of engagement with the incision 30 of the cap. In this manner a simple, but perfectly reliable and detachable connection of the strap with the axle is obtained. The connection of the wire strap with the axle and the securing of this connection may, however, be effected in any other suitable manner.

The wire strap, made in one part or of several parts, may for instance be inserted into merely axially extending end slots of the axle and secured in position by caps tightly fitting on the ends of the axle. If the axle is made of sheet metal so that it has an open seam, the outwardly directed resiliency of the tubular axle will be utilized to securely hold the caps pushed over the axle ends.

We claim:—

1. A device for winding up electric flexible cords, comprising a spring controlled reel having two side plates and a middle disc subdividing the winding space of said reel into two compartments in which the cord ends are wound and unwound separately the one from the other, the middle disc having a slot composed of a radial portion and of a portion extending in circumferential direction relative to the reel and forming an angular extension of said radial slot so that at the point at which the two portions of the slot join a hook is formed in the disc designed to hold the cord.

2. A device for winding up electric flexible cords, comprising a spring controlled reel having two side plates and a middle disc subdividing the winding space of said reel into two compartments in which the cord ends are wound and unwound separately the one from the other, the middle disc having a slot composed of a radial portion and of a portion extending in circumferential direction relative to the reel and forming an angular extension of said radial slot so that at the point at which the two portions of the slot join a hook is formed in the disc designed to hold the cord, and a cone formed by thickenings on the two sides of the disc at the end of said slot forming a wide bearing for the cord.

3. A device for winding up electric flexible cords, comprising a spring controlled reel having two side plates and a middle disc subdividing the winding space of said reel into two compartments in which the cord ends are wound and unwound separately the one from the other, the middle disc having a slot composed of a radial portion and of a portion extending in circumferential direction relative to the reel and forming an angular extension of said radial slot so that at the point at which the two portions of the slot join a hook is formed in the disc designed to hold the cord, and a cone formed by thickenings on the two sides of the disc at the end of said slot and of semi-wedge shaped form for improving the distribution of the cord to be wound up in the winding up compartment.

4. A device as specified in claim 1, comprising in combination with the side plate and the middle disc of the reel, a hub on each of said side plates, a hub on said middle disc, said hubs forming a reel casing, a torsion spring in said casing, a projection on said casing, said spring having a hook-shaped end, and a steel plate on said spring end bearing against said projection.

5. A device for winding up electric flexible cords, comprising in combination a spring controlled reel having two side plates and a middle disc subdividing the winding space of said reel into two compartments in which the cord ends are wound up or unwound separately the one from the other, an axle for said reel having bayonet slots in its ends, a wire strap for guiding the cord and engaging with its ends in said slots, and caps one on each end of said axle for securely holding said strap in said slots.

6. A device for winding up electric flexible cords, comprising in combination a spring controlled reel having two side plates and a middle disc subdividing the winding space of said reel into two compartments in which the cord ends are wound up or unwound separately the one from the other, an axle for said reel having bayonet slots in its ends, a wire strap for guiding the cord and engaging with its ends in said slots, caps one on each end of said axle for securely holding said strap in said slots, and an inwardly directed projection in each of said caps near the open end of the cap adapted to engage behind the knee of the corresponding bayonet-shaped slot.

7. A device for winding up electric flexible cords, comprising in combination a spring controlled reel having two side plates and a middle disc subdividing the winding space of said reel into two compartments in which the cord ends are wound up or unwound separately the one from the other, an axle for said reel having bayonet slots in its ends, a wire strap for guiding the cord and engaging with its ends in said slots, caps one on each end of said axle for securely holding said strap in said slots, and an inwardly directed projection in each of said caps near the open end of the cap adapted to engage behind the knee of the corresponding bayonet-shaped slot, said caps having each a curved incision in the edge of the open end adapted to hold the corresponding arm of said strap.

8. A device for winding up electric flexible cords, comprising in combination a spring controlled reel having two side plates and a middle disc subdividing the winding space of said reel into two compartments in which the cord ends are wound up or unwound separately the one from the other, an axle for said reel having slots in its ends, and a wire strap for guiding the cord and engaging with its ends in said slots, said strap made of a piece of wire bent several times to produce the strap shape, lugs formed near one end of said strap, a bush mounted in said lugs, a guide pulley rotatable on said bush and adapted to guide one end of the cord on to and off said reel, an eye formed on the end of said strap and adapted to maintain the cord on said pulley, and a guide loop formed on the other end of said strap and adapted to guide the other end of the cord on to and off said reel.

9. A device for winding up electric flexible cords, comprising in combination a spring controlled reel having two side plates and a middle disc subdividing the winding space of said reel into two compartments in which the cord ends are wound up or unwound separately the one from the other, an axle for said reel having slots in its ends, and a wire strap for guiding the cord and engaging with its ends in said slots, said strap made of a piece of wire bent several times to produce the strap shape, lugs formed near one end of said strap, a bush consisting of a closely wound wire mounted in said lugs, a guide pulley rotatable on said bush and adapted to guide one end of the cord on to and off said reel, an eye formed on the end of said strap and adapted to maintain the cord on said pulley, a guide loop formed on the other end of said strap and adapted to guide the other end of the cord on to and off said reel, and head pins with roughened shanks inserted through said lugs into said bush to detachably secure said bush and said pulley in said lugs.

FRIEDRICH W. HEUSINKVELD.
ERNST GROSSE BRAUCKMANN.